United States Patent
Bae et al.

(10) Patent No.: US 6,940,806 B2
(45) Date of Patent: Sep. 6, 2005

(54) DISC CARTRIDGE (75) Inventors: Byoung-young Bae, Gyeonggi-do (KR); Soon-kyo Hong, Seoul (KR); Kwang Kim, Seoul (KR); Hae-sub Kweon, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 159 days.

(21) Appl. No.: 10/133,903

(22) Filed: Apr. 29, 2002

(65) Prior Publication Data

US 2002/0191532 A1 Dec. 19, 2002

(30) Foreign Application Priority Data

Jun. 14, 2001 (KR) ........................................ 2001-33529

(51) Int. Cl.[7] .............................................. G11B 23/03
(52) U.S. Cl. ...................................... 369/291; 720/728
(58) Field of Search .......................... 369/291; 360/133, 360/135

(56) References Cited

U.S. PATENT DOCUMENTS

| | | | | |
|---|---|---|---|---|
| 4,692,831 A | * | 9/1987 | Suzuki ........................ 360/133 |
| 4,799,123 A | * | 1/1989 | Kanazawa et al. ........... 360/133 |
| 5,084,861 A | * | 1/1992 | Takahashi ..................... 369/291 |
| 5,121,278 A | * | 6/1992 | Tanaka et al. ............... 360/133 |
| 5,898,664 A | * | 4/1999 | Kikuchi et al. .............. 369/291 |
| 6,014,365 A | * | 1/2000 | Tanaka ........................ 369/291 |
| 2002/0121447 A1 | | 9/2002 | Luckow | |
| 2002/0139701 A1 | | 10/2002 | Luckow | |

FOREIGN PATENT DOCUMENTS

| | | |
|---|---|---|
| CN | 2107164 | 3/2004 |
| DE | WO 00/65596 | 11/2000 |
| JP | 62-164658 | 10/1987 |
| JP | 7-73633 | 3/1995 |

* cited by examiner

Primary Examiner—A. J. Heinz
Assistant Examiner—Mark Blouin
(74) Attorney, Agent, or Firm—Stein, McEwen & Bui, LLP

(57) ABSTRACT

A disc cartridge for receiving a disc includes a case which accommodates the disc and at least one centering spring which prevents deviation of the disc in the case. Thus, a gap in which the disc moves in the disc cartridge is restricted so as to reduce a length in which a disc clamp of the disc contacts a disc clamp guide inside a disc drive system. Accordingly, the height of the disc clamp is reduced so as to reduce the thickness of the disc cartridge and miniaturize the disc cartridge.

29 Claims, 6 Drawing Sheets

DISC CARTRIDGE

CROSS-REFERENCE TO RELATED APPLICATIONS

This application claims the benefit of Korean Application No. 2001-33529, filed Jun. 14, 2001, in the Korean Industrial Property Office, the disclosure of which is incorporated herein by reference.

BACKGROUND OF THE INVENTION

1. Field of the Invention

The present invention relates to a disc cartridge, and more particularly, to a disc cartridge having a case which accommodates a disc and centers the disc within an area in the case.

2. Description of the Related Art

Figure 1:
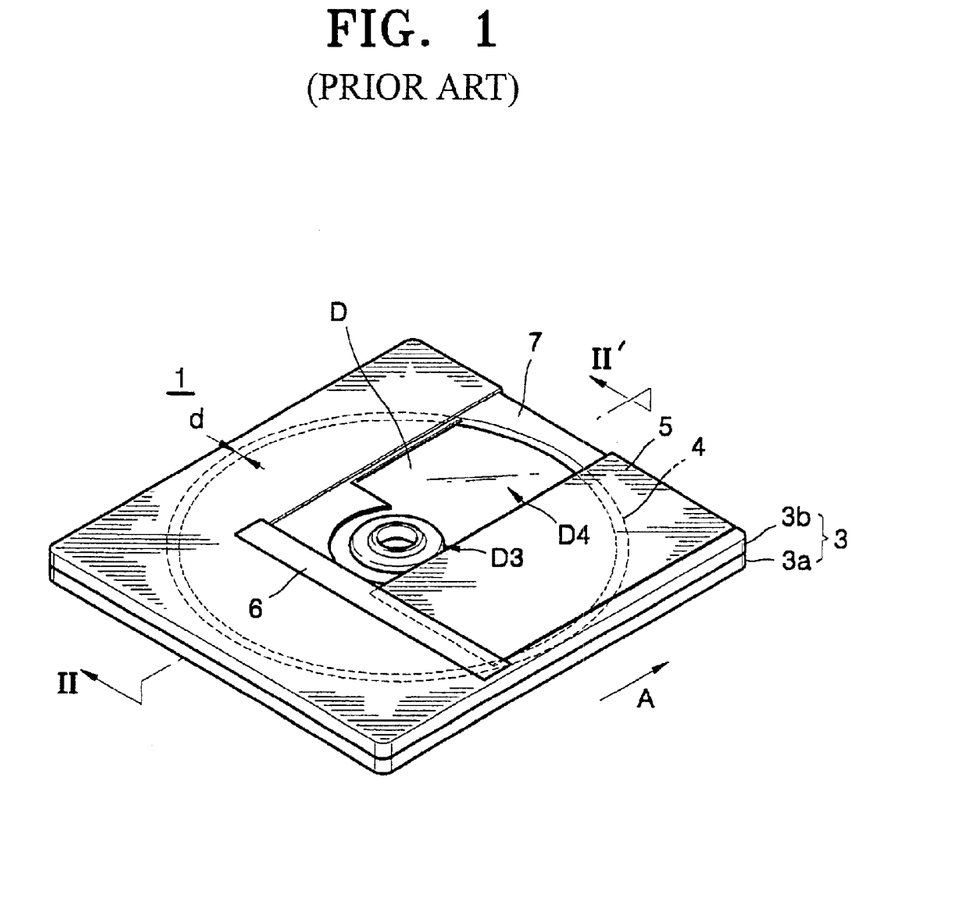
FIG. 1 is a perspective view of a conventional disc cartridge which is loaded and unloaded in a slot-in manner.

FIG. 1 shows a conventional disc cartridge 1, which is loaded and unloaded in a slot-in manner, with a shutter 5 open. The disc cartridge 1 includes a case 3 which forms the outer appearance of the disc cartridge 1, and a circular inner wall 4 which encompasses a space where a disc D is placed therein. The circular inner wall 4 is spaced apart from an edge of the disc D by a predetermined gap 'd'.

The case 3 includes an upper case 3a and a lower case 3b. A clamping area D3 of the disc D and an open portion 7 corresponding to a read/write area D4 of the disc D are located in the lower case 3b. The clamping area D3 and the open portion 7 are opened and shut by the shutter 5 guided by a shutter guide 6.

Figure 2A:
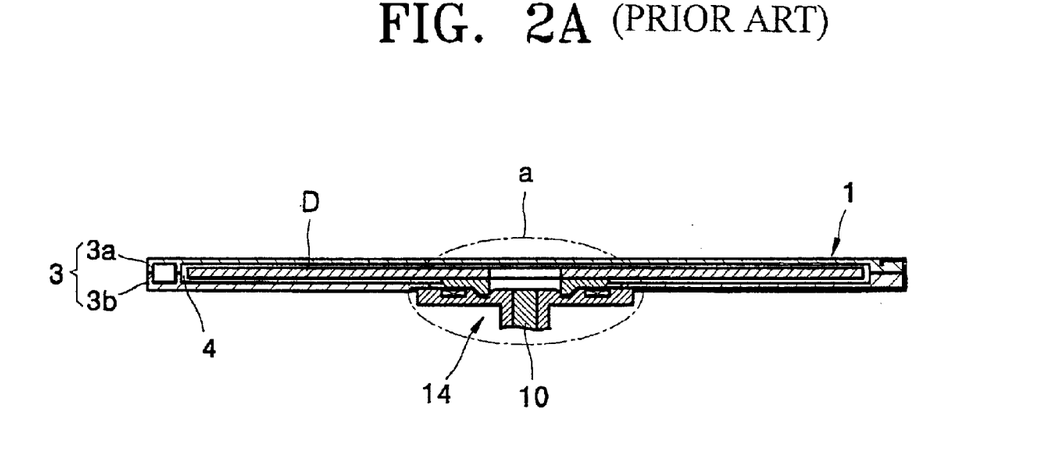
FIG. 2A is a sectional view taken along line II–II' of FIG. 1.
Figure 2B:
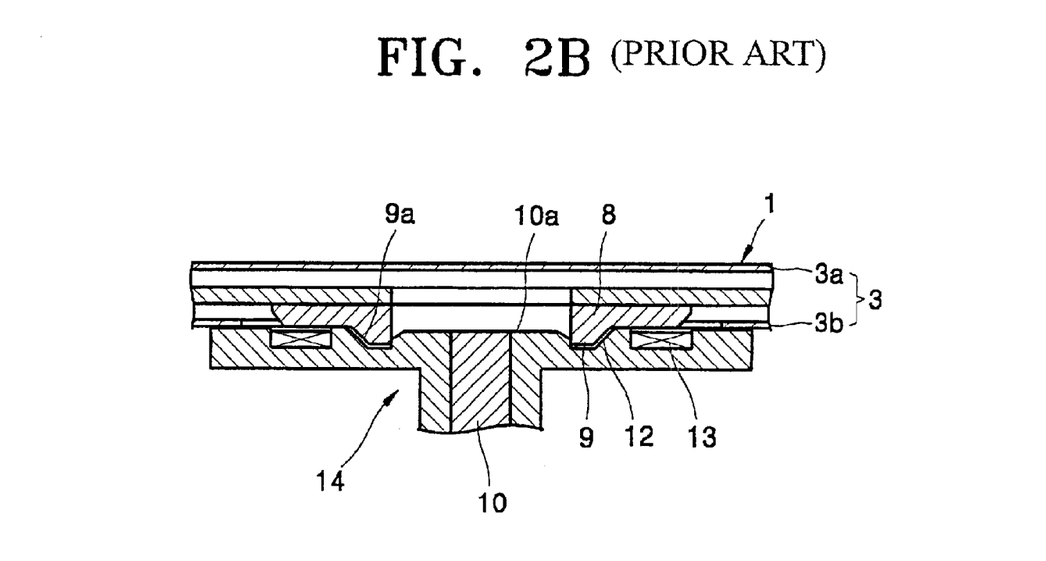
FIG. 2B is an enlarged sectional view of a portion indicated by 'a' in FIG. 2A.

FIG. 2A shows a sectional view taken along line II–II' of FIG. 1, in which the disc D is placed on a spindle hub 14. FIG. 2B shows an enlarged sectional view of an oval portion referenced by 'a' in FIG. 2A. Referring to FIGS. 2A and 2B, a disc clamp 8 which has a donut shape having a through hole at the center thereof is provided at the central portion of the disc D. A convex portion 9 where an inclined portion 9a is formed along an edge thereof is formed around the through hole at a bottom surface of the disc clamp 8. The disc clamp 8 is placed on the spindle hub 14.

The spindle hub 14 includes a guide portion 12 inclined corresponding to the convex portion 9 of the disc clamp 8 and a permanent magnet 13 which generates a clamping force with respect to the disc clamp 8. A spindle hub shaft 10 having a protruding portion 10a which centers the disc D with respect to the spindle hub 14, by entering the through hole of the disc clamp 8 of the disc D, is formed at the central portion of the spindle hub 14.

Loading and unloading operations of the disc cartridge 1 with respect to a slot-in type disc drive (not shown) are described in detail below with reference to FIGS. 1, 2A and 2B.

When the disc cartridge 1 is pushed into the slot-in type disc drive ("disc drive"), the shutter 5 is moved to one side along the shutter guide 6 to open the open portion 7 so as to allow an optical pickup (not shown) to access the read/write area D4 of the disc D. Here, the case 3 is firmly held by a loading/unloading apparatus (not shown) of the disc drive. When the inclined portion 9a of the disc clamp 8 is positioned within a corresponding inclined area of the guide portion 12, the disc D slides along an inclined surface of the guide portion 12 so as to have the disc clamp 8 and the spindle hub 14 engage with each other. Thus, the disc clamp 8 is accommodated on the spindle hub shaft 10 and firmly held by a magnetic force of the permanent magnet 13.

When the disc cartridge 1 is unloaded from the disc drive, the disc cartridge 1 is pressed in a direction indicated by an arrow A in FIG. 1 in which the disc cartridge 1 enters the disc drive. Here, only the case 3 is moved in the direction A in a state in which the disc D is firmly held on the spindle hub 14. Next, an unloading system (not shown) of the disc drive pushes the cartridge 1 in a direction opposite to the direction A of FIG. 1. Accordingly, a portion of the lower case 3b of the disc cartridge 1 adjacent to the disc clamp 8 is inserted between the disc clamp 8 and the spindle hub 14 to separate the disc clamp 8 from the guide portion 12. The separated disc cartridge 1 is unloaded from the disc drive and the shutter 5 is shut.

Thus, when the disc cartridge 1 having the above structure is unloaded, a gap in which the case 3 can move in a state in which the disc D is firmly held by the magnetic force of the spindle hub 14, is needed. That is, the gap 'd' between the outer circumference of the disc D and the circular inner wall 4 should be greater than a gap required for rotation of the disc D by a spindle motor (not shown). The disc D to be loaded moves within the above gap inside the case 3. When the disc D moved to one side in the disc cartridge 1 is to be accommodated on the spindle hub 14, since the inclined portion 9a of the disc clamp 8 must be designed to be positioned within an inclined area of the guide portion 12 corresponding to the inclined portion 9a, the width of the inclined portion 9a increases in proportion to the gap 'd' between the outer circumference of the disc D and the circular inner wall 4. Accordingly, the height of the convex portion 9 and the thickness of the disc cartridge 1 also increases, thereby preventing a miniaturization of the disc cartridge 1.

SUMMARY OF THE INVENTION

Accordingly, it is an object of the present invention to provide a disc cartridge which secures an allowance in a gap between a disc and a case of the disc cartridge where the disc cartridge is unloaded from a slot-in type disc drive, and centers the disc received in the disc cartridge within a predetermined range after the disc cartridge is loaded/unloaded in the slot-in type disc drive.

Additional objects and advantages of the invention will be set forth in part in the description which follows, and, in part, will be obvious from the description, or may be learned by practice of the invention.

To achieve the above and other objects of the present invention, there is provided a disc cartridge receiving a disc having an outer circumference, comprising a case for accommodating the disc having a gap which is provided outwardly from the outer circumference of the disc, and at least one centering spring which prevents deviation of the disc in the case.

According to an aspect of the present invention, the centering spring comprises a contact portion which faces the disc and receives a pressing force through contact with the disc, and an elastic portion which extends from the contact portion and fixed by the case, wherein the elastic portion elastically deforms in a direction of the pressing force applied to the contact portion by the disc.

According to another aspect of the present invention, second, third and fourth centering springs are provided.

According to yet another aspect of the present invention, the contact portion protrudes from an inner wall of the case toward the outer circumference of the disc, wherein the inner wall forms an accommodating space for the disc and provides the gap between the outer circumference of the disc and the inner wall. The elastic portion may be formed at both sides of the contact portion or at one side of the contact portion.

According to still another aspect of the present invention, the centering spring is formed integrally with the case.

BRIEF DESCRIPTION OF THE DRAWINGS

The above and other objects and advantages of the present invention will become more apparent by describing in detail preferred embodiments thereof with reference to the attached drawings in which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 3:
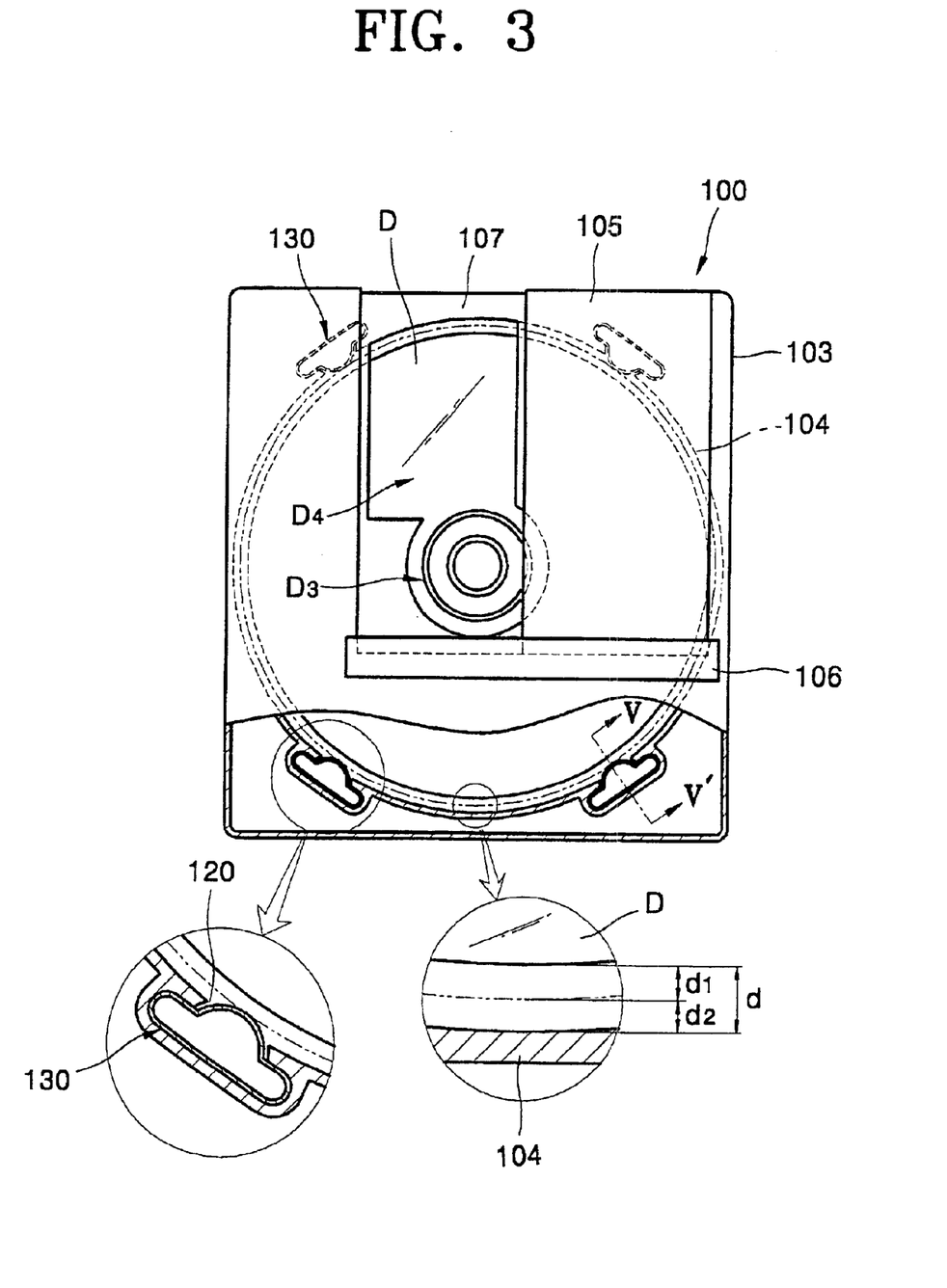
FIG. 3 is a partially cut-away plan view showing a disc cartridge having a centering spring according to an embodiment of the present invention.
Figure 4:
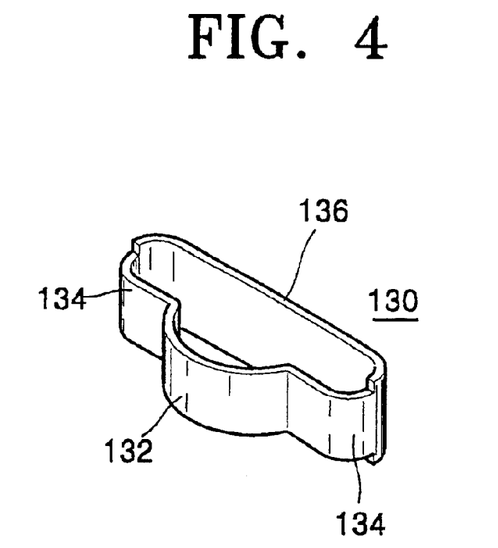
FIG. 4 is a perspective view showing the centering spring of FIG. 3.
Figure 5:
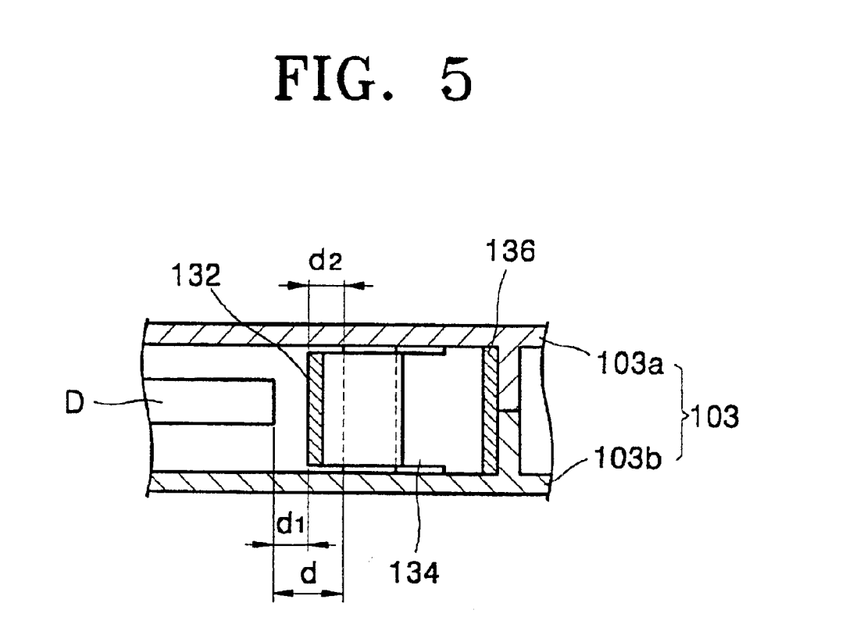
FIG. 5 is a sectional view taken along line V–V' of FIG. 3.

In FIGS. 3, 4 and 5, the same elements having the same functions as those in FIGS. 1, 2A and 2B are indicated by the same reference numerals and descriptions thereof may be omitted.

FIGS. 3, 4 and 5 show a disc cartridge 100, a centering spring 130 and a sectional view of the centering spring 130, respectively, according to an embodiment of the present invention. The disc cartridge 100 includes a case 103 which forms the outer appearance of the disc cartridge 100 and an inner wall 104 of the case 103 which defines a space for accommodating a disc D. The case 103 is divided into an upper case 103a and a lower case 103b, as shown in FIG. 5. A clamping area D3 and an open portion 107 which allows access to a read/write area D4 are located on the lower case 103a. In addition, a shutter 105 which selectively opens/shuts the open portion 107 and a shutter guide 106 which guides the shutter 105 are provided to the case 103.

The inner wall 104 is formed with a predetermined gap 'd' from an outer circumference of the disc D to the inner wall 104. A plurality of recesses 120 are formed in parts of the inner wall 104. A centering spring 130, which selectively contacts the outer circumference of the disc D and restricts the position of the disc D, is provided in each of the recesses 120. As shown in FIG. 4, the centering spring 130 includes a contact portion 132 which may contact the disc D, a support portion 136, which extends from the contact portion 132 and is fixed by the recess 120 of the inner wall 104 inside the case 103, and elastic portions 134 which elastically deform in response to a pressing force of the disc D in a direction of the pressing force (in the opposite direction to a direction indicated by an arrow B in FIG. 6 ). The support portion 136 may be formed integrally with the inner wall 104 and the case 103.

The gap 'd' between the disc D and the inner wall 104 is a sum of a gap d1 between the outer circumference of the disc D and a contact surface of the contact portion 132, and a gap d2 between the contact surface of the contact portion 132 and the inner wall 104, as shown in Equation 1 below:

$$d = d1 + d2 \qquad \text{Equation 1}$$

The gap d1 is an allowance gap needed for the disc D to rotate within the disc cartridge 100. The gap d2 is a securing gap which secures a gap between the disc D and the inner wall 104 in a state in which the disc D is firmly held on the spindle hub 14 (FIG. 2B) where, for example, the disc cartridge 100 is unloaded from a disc drive (not shown) by being pushed in a direction indicated by the arrow B in FIG. 6.

The loading and unloading operations of the disc cartridge 100 having the centering spring 130 of the above structure with respect to a slot-in type disc drive (not shown) is described below with reference to FIGS. 3–5. The spindle hub 14 and the disc clamp 8 described hereinbelow have the same structures and functions as those shown in FIGS. 2A and 2B while having different sizes thereof.

Figure 6:
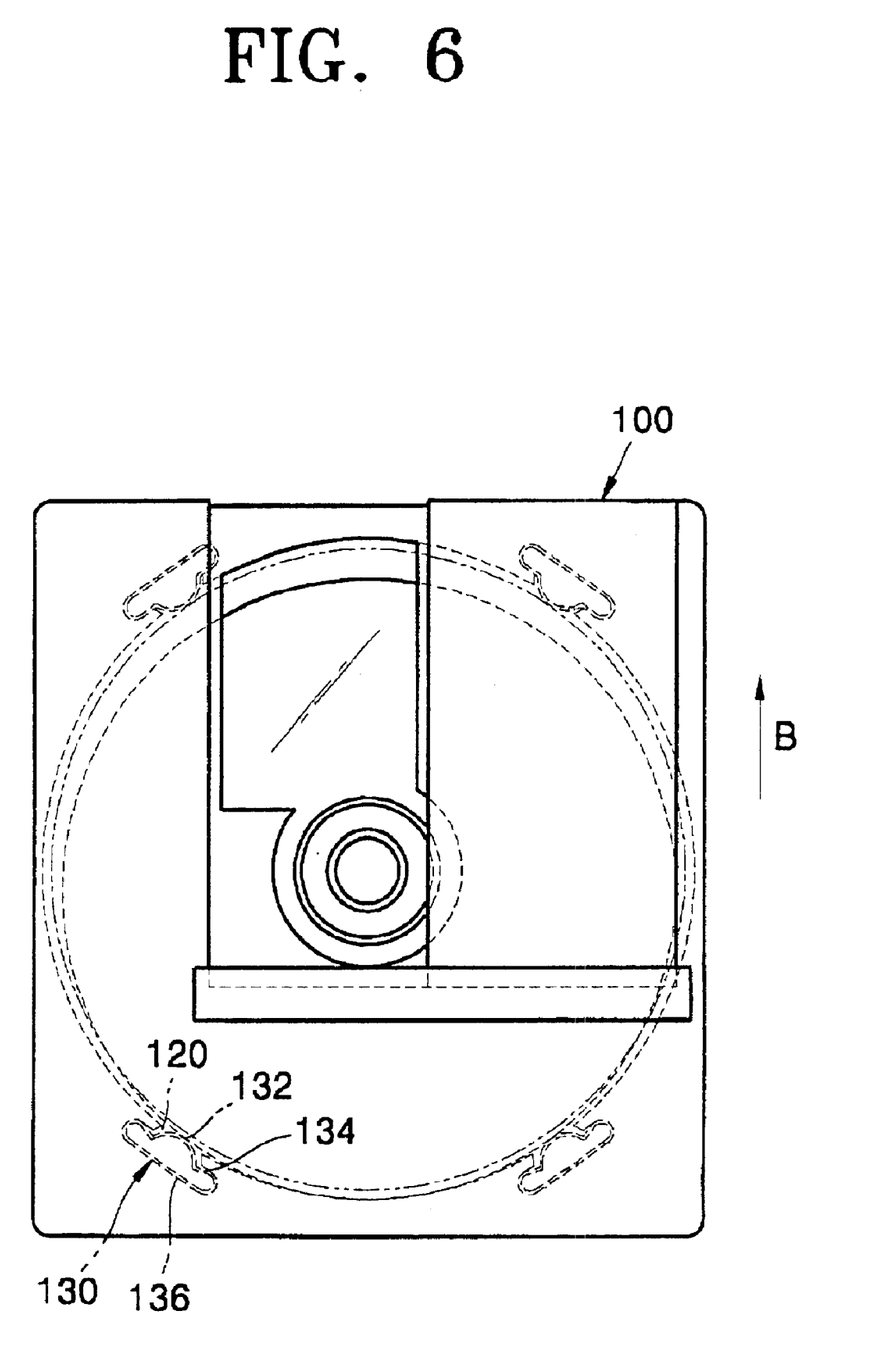
FIG. 6 is a plan view of the disc cartridge of FIG. 3, illustrating an operation of the disc cartridge.

FIG. 6 shows, with reference to FIGS. 3–5, the disc cartridge 100 during a loading/unloading operation. When the disc cartridge 100 is pushed into the disc drive, the shutter 105 moves to one side along the shutter guide 106 to open the open portion 107 so as to allow an optical pickup (not shown) to access the read/write area D4 of the disc D. Here, the case 103 is firmly held by a loading/unloading apparatus (not shown) of the disc drive. Referring to FIG. 2B, when an inclined portion 9a of a disc clamp 8 of the clamping area D3 is positioned within a range of an inclination area of the corresponding guide portion 12 of the spindle hub 14, the disc D centered within the gap d1 by the centering spring 130 slides along the inclination area of the guide portion 12. The disc clamp 8 and the spindle hub 14 are engaged and clamped with each other by a magnetic force of the magnet 13.

To unload the disc cartridge 100 from the disc drive, the disc cartridge 100 is pushed in the direction B of FIG. 6 in which the disc cartridge 100 enters the disc drive. The disc cartridge 100 in which the disc D is firmly held on the spindle hub 14 enters in the direction B. Accordingly, as shown in FIG. 6, the contact portion 132 of the centering spring 130 disposed at a tail portion of the disc cartridge 100 with respect to the direction B is pressed by the disc D, so as to have the elastic portions 134 elastically deformed by the gap d2 toward the recess 120. Thus, an allowance in distance between the outer circumference of the disc D and the inner wall 104 is secured as in the state in which the centering spring 130 does not exist.

Next, an unloading system (not shown) of the disc drive pushes the disc cartridge 100 in a direction in which the disc cartridge 100 is unloaded, that is, in the direction opposite to the direction B of FIG. 6. Accordingly, a portion of the lower case 103b of the disc cartridge 100 which is adjacent to the disc clamp 8 is inserted between the disc clamp 8 and the spindle hub 14 (FIG. 2B) to separate the disc clamp 8 from the guide portion 12 (FIG. 2B). The separated disc cartridge 100 is unloaded from the disc drive and the shutter 105 is shut. The elastically deformed elastic portions 134 are restored to their original states.

Figure 7:
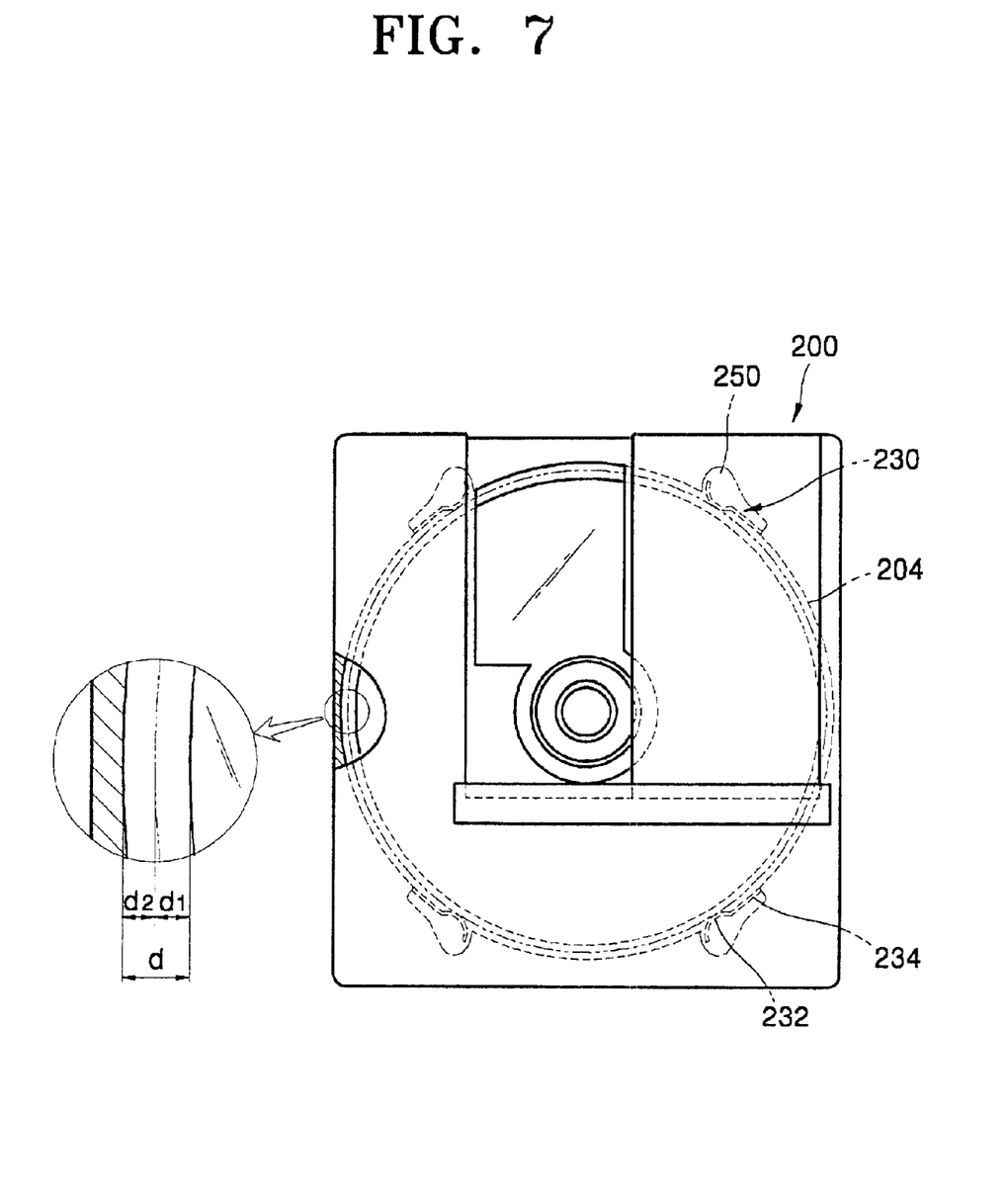
FIG. 7 is a plan view showing a disc cartridge having a centering spring according to another embodiment of the present invention.

FIG. 7 shows a disc cartridge 200 having centering springs 230 according to another embodiment of the present invention. A plurality of recesses 250 are formed in an inner wall 204 to be spaced a predetermined gap apart from the disc D accommodated in the disc cartridge 200. A cantilever centering spring 230 is provided in each of the recesses 250. The cantilever centering sprig 230 includes a contact portion 232 which may contact the disc D, and an elastic portion 234 having one side portion supported at the recess 250 and elastically deformed. The cantilever centering spring 230 may be formed integrally with the inner wall 204 and the recess 250 by a one-time injection molding operation. The gap 'd' between the disc D and the inner wall 204 is a sum of the gap d1 between an outer circumference of the disc D and a contact surface of the contact portion 232, and a gap d2 between the contact surface of the contact portion 232 and the inner wall 104.

The disc cartridge 200 having the centering spring 230 of the above cantilever structure maintains a state in which the disc D loaded in the disc drive is primarily centered as in the disc cartridge 100 in FIG. 3. When the disc cartridge 200 is unloaded from the disc drive, the pressure by the disc D is transferred to the contact portion 232. Accordingly, the elastic portion 234 deforms inwardly to the recess 250 and provides an allowance in the gap to the opposite side.

As described above, in the disc cartridge according to the present invention, a gap in which a disc moves in the disc cartridge is selectively restricted so as to reduce a length in which the disc clamp contacts the disc clamp guide. Thus, the height of the disc clamp is reduced so as to reduce the thickness of the disc cartridge and miniaturize the disc cartridge.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A disc cartridge receiving a disc having an outer circumference, the disc cartridge comprising:
   a case accommodating the disc and having a gap which is provided outwardly from the outer circumference of the disc; and
   at least one centering spring, which contacts a side edge of the disc to prevent deviation of the disc in the case, comprising
      a non-elastic contact portion disposed to face the side edge of the disc and receive a pressing force through a contact with the disc, and
      an elastic portion extending from the contact portion and elastically deforming in a direction of the pressing force applied to the contact portion by the disc, the elastic portion being selectively biased such that the disc is rotatably maintained in the case when the elastic portion is unbiased.

2. The disc cartridge as claimed in claim 1, wherein four centering springs are provided.

3. The disc cartridge as claimed in claim 1, wherein the elastic portion comprises:
   a first elastic portion positioned at a first side of the contact portion; and
   a second elastic portion positioned at a second side of the contact portion.

4. The disc cartridge as claimed in claim 1, further comprising:
   an open portion formed on the case which allows access to the disc;
   a shutter which selectively opens/closes the open portion; and
   a shutter guide which guides the shutter.

5. The disc cartridge as claimed in claim 1, wherein the case includes an inner wall which defines an accommodating space for the disc and the gap between the inner wall and the outer circumference of the disc, wherein the contact portion protrudes from the inner wall.

6. The disc cartridge as claimed in claim 5, wherein:
   the elastic portion is positioned at only one side of the contact portion; and
   the elastic portion is connected to the inner wall.

7. The disc cartridge as claimed in claim 6, wherein the centering spring is formed integrally with the inner wall.

8. The disc cartridge as claimed in claim 6, wherein the centering spring is a cantilever spring.

9. The disc cartridge as claimed in claim 5, wherein the inner wall has a recess, which receives the centering spring.

10. The disc cartridge as claimed in claim 9, wherein a shape of the recess corresponds with a shape of the elastic portion, to position and restrain the centering spring.

11. The disc cartridge as claimed in claim 10, wherein:
   the centering spring further comprises a support portion connected to the elastic portion; and
   the shape of the recess corresponds with a shape of the support portion.

12. The disc cartridge as claimed in claim 11, wherein the support portion is integrally formed with the inner wall.

13. The disc cartridge as claimed in claim 9, wherein the recess is continuous with the inner wall.

14. The disc cartridge as claimed in claim 5, wherein the gap ('d') satisfies the following relationship:

$$d = d1 + d2$$

where d1 is an allowance gap between the outer circumference of the disc and a contact surface of the contact portion, and d2 is a securing gap between the contact surface of the contact portion and the inner wall of the case.

15. The disc cartridge as claimed in claim 14, wherein:
   the allowance gap is a minimum gap required for rotation of the disc in the case, and
   the securing gap is an additional allowance required for a loading/unloading operation of the disc cartridge.

16. The disc cartridge as claimed in claim 14, wherein the centering spring centers the disc within the allowance gap.

17. A disc cartridge receiving a disc, comprising:
   a case containing the disc; and
   a centering spring, which selectively contacts a side edge of the disc and positions the disc within an area in the case, comprising
      a non-elastic contact portion disposed to face the side edge of the disc, and
      an elastic portion extending from the contact portion, elastically deforming in response to a pressing force applied to the contact portion from the disc, and providing a restoring force to the contact portion, to rotatably maintain the disc within the area in the case when the elastic portion is unbiased, in response to an absence of the pressing force.

18. The disc cartridge as claimed in claim 17, wherein the centering spring centers the disc within the area in the case during a loading/unloading of the disc cartridge from a disc drive which reads and/or records data from the disc.

19. The disc cartridge as claimed in claim 17, wherein the case includes an inner wall which forms an accommodating space for the disc and a gap between the inner wall and an outer circumference of the disc, wherein the contact portion protrudes inward from the inner wall.

20. The disc cartridge as claimed in claim 19, wherein the gap ('d') satisfies the following relationship:

$$d=d1+d2$$

where d1 is an allowance gap between the outer circumference of the disc and a contact surface of the contact portion, and d2 is a securing gap between the contact surface of the contact portion and the inner wall of the case, wherein:

the allowance gap is a minimum gap required for rotation of the disc in the case and defines the area, and the securing gap is an additional allowance required for a loading/unloading operation of the disc cartridge.

21. The disc cartridge as claimed in claim 20, wherein the centering spring is formed integrally with the inner wall.

22. The disc cartridge as claimed in claim 20, further comprising second, third and fourth centering springs.

23. A disc cartridge receiving a disc, comprising:

a case containing the disc having an initial inner rotational dimension and an inner wall; and a centering spring which selectively changes the inner rotational dimension of the case to control a position of the disc in the case, comprising
 a non-elastic contact portion that moves with respect to the inner wall to enlarge the inner rotational dimension in response to a contact and a pressing force of the disc, and
 an elastic portion extending from the contact portion and providing a restoring force to the contact portion, to rotatably restrict the disc within the initial inner rotational dimension when the elastic portion is unbiased, in response to an absence of the pressing force.

24. The disc cartridge as claimed in claim 23, wherein the inner rotational dimension is a minimum circumference required for rotation of the disc in the case.

25. The disc cartridge as claimed in claim 23, further comprising second, third and fourth centering springs.

26. The disc cartridge as claimed in claim 24, wherein the centering spring is formed integrally with the inner wall.

27. A disc cartridge receiving a disc, comprising:

a case containing the disc; and a plurality of centering springs, which selectively contact a side edge of the disc and position the disc within an area in the case, each centering spring comprising
 a non-elastic contact portion disposed to face a side edge of the disc, and
 an elastic portion extending from the contact portion, elastically deforming in response to a pressing force applied to the contact portion from the disc, and providing a restoring force to the contact portion, to rotatably maintain the disc within the area in the case when the elastic portion is unbiased, in response to an absence of the pressing force.

28. The disc cartridge as claimed in claim 27, wherein the centering springs center the disc within the area in the case during a loading/unloading of the disc cartridge from a disc drive which reads and/or records data from the disc.

29. A disc cartridge receiving a disc, comprising:

a case containing the disc; and a plurality of centering springs, which contact a side edge of the disc and automatically position the disc within an area in the case during a loading/unloading of the disc cartridge, each centering spring comprising
 a non-elastic contact portion disposed to face a side edge of the disc, and
 an elastic portion extending from the contact portion, elastically deforming in response to a pressing force applied to the contact portion from the disc, and providing a restoring force to the contact portion, to rotatably maintain the disc within the area in the case when the elastic portion is unbiased, in response to an absence of the pressing force.

* * * * *

UNITED STATES PATENT AND TRADEMARK OFFICE
CERTIFICATE OF CORRECTION

PATENT NO. : 6,940,806 B2
DATED : September 6, 2005
INVENTOR(S) : Byoung-young Bae et al.

It is certified that error appears in the above-identified patent and that said Letters Patent is hereby corrected as shown below:

Column 8,
Line 1, change "claim 23" to -- claim 24 --.

Signed and Sealed this

Seventeenth Day of January, 2006

JON W. DUDAS
*Director of the United States Patent and Trademark Office*